United States Patent

[11] 3,633,183

[72] Inventors Richard O. Cobb;
James Lipp, both of Poughkeepsie, N.Y.
[21] Appl. No. 874,172
[22] Filed Nov. 5, 1969
[45] Patented Jan. 4, 1972
[73] Assignee International Business Machines Corporation
Armonk, N.J.

[54] OPTICAL INFORMATION RECORDING WITH REAL-TIME DISPLAY AND ERROR CORRECTION
4 Claims, 4 Drawing Figs.

[52] U.S. Cl. 340/173 LT, 178/17 D, 340/173 LM, 346/76 L
[51] Int. Cl. G11c 13/04, G01d 3/02
[50] Field of Search 340/173 R, 173 LT, 173 LM, 324 A; 346/76 L, 108; 178/30, 23.1, 69 G, 17 D

[56] References Cited
UNITED STATES PATENTS 3,124,784 3/1964 Schaaf 340/173 L
3,166,636 1/1965 Rutland 340/324 A
3,394,366 7/1968 Dye 340/324 A

OTHER REFERENCES

King, Recording Information by Laser, 1/65, Discovery (magazine) pp. 19–22

*Primary Examiner*—Bernard Konick
*Assistant Examiner*—Stuart Hecker
*Attorneys*—Hanifin and Jancin and John F. Osterndorf

ABSTRACT: A process and system for controlling the recording of information optically. Before the optical recording occurs, a real-time display of the information to be recorded is provided for operator monitoring. The ability to change the information by a light pen and/or a keyboard exists if the displayed information is incorrect. In the optical recording process, control is exercised over the light source, the position of the light and the location of recording. Monitoring of the recorded information is simultaneously performed with the recording to indicate any error condition in the recording process.

INVENTORS
RICHARD O. COBB
JAMES LIPP
BY John F. Ostendorf
ATTORNEY

OPTICAL INFORMATION RECORDING WITH REAL-TIME DISPLAY AND ERROR CORRECTION

BACKGROUND OF THE INVENTION

1. Field of the Invention

This invention relates to a system and process for recording information and, more particularly, to the control exercised by a computer in the process of optically recording information.

2. Description of the Prior Art

Optical recording systems are known in which a laser light source is utilized to record information as holes or no holes in a moving optical recording medium. To generate the presence or absence of a hole, control is exercised over the light beam by information acted on by a computer. This information is fed to the computer from suitable storage devices.

Such systems monitor the recorded information in a read while write operation. A portion of the light forming a hole in the medium is detected and fed back to the computer for verification with the control recording signals. Thus, such systems provide an error indication only after the recording has been accomplished. No opportunity is provided for altering or changing the information before the recording occurs. Consequently, the entire process can continue with loss of recording medium and time of recording before the indication of an error is provided.

SUMMARY OF THE INVENTION

As contrasted with the prior art type of optical recording system, the process and system of the invention provides for a real-time display of the information to be recorded prior to the initiation of the actual recording. The information may be altered or changed before the recording takes place in the event that an error condition is detected. Additionally, any error occurring in the optical recording portion of the system is monitored during the recording process and fed back to the computer controls for an indication of its presence and subsequent action.

The optical recording of information is accomplished with a computer controlled system operating through its storage access channel to an access and control unit which connects to a visual display and an optical recorder. Upon the initiation of the command START REGENERATION of information, the computer draws on its main storage to provide the commands and controls necessary for performing the operation as well as the actual information to be recorded. Through suitable data registers and operation decoders, the information and controls are provided through a gating arrangement to a display device for monitoring by an operator. The actual information to be recorded is actually visually displayed a frame at a time.

If an error as to the presence or absence of a particular bit of information or its location in a given frame is detected at the display, the information may be altered using a light pen or a keyboard entry device to write back in the main storage of the computer. This is accomplished by gating back into data interrupt controls which communicate with the main memory as well as act to interrupt the regeneration of the data. Only when the operator is satisfied that the displayed information is free of error is the actual recording initiated either through separate control or by use of the delay interlocks in the system.

The actual recording takes place with a laser beam recorder. Control is exercised over the provision of the light beam, its position in recording and the particular frame location of the output medium through the control and information signals provided from the computer. Concurrent with the recording of the information on the recording medium, a portion of the light beam is provided to detection apparatus which communicates back through reentry gating controls to provide an interrupt condition for the recording if an error is detected in the light source, the position of the light source or the location of recording on a particular frame of the recording medium. Control is also exercised to allow for the skipping of frames on the recording medium.

DESCRIPTION OF THE PREFERRED EMBODIMENT

Figure 1:
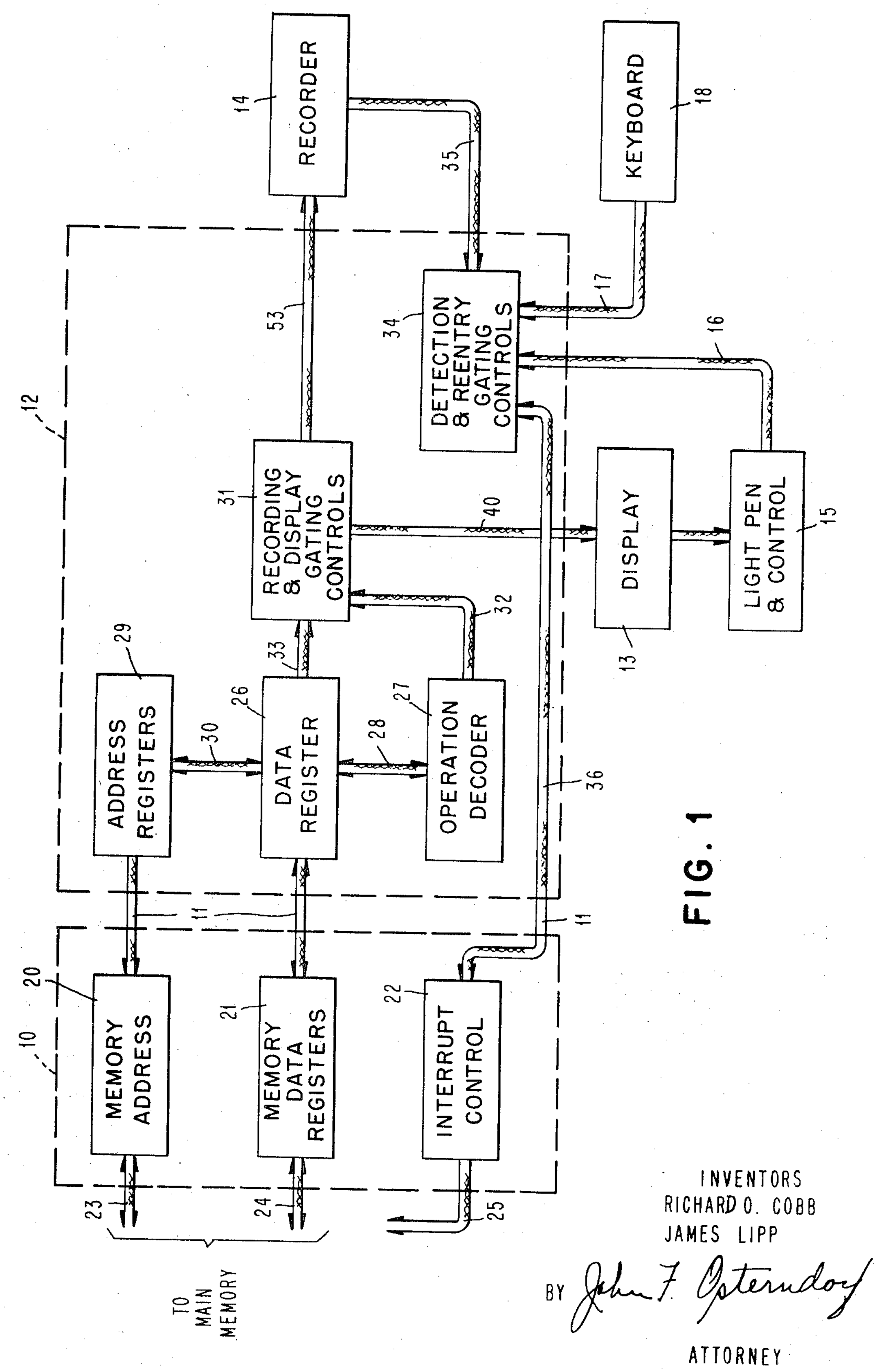
FIG. 1 is a block diagram of the computer control system utilized in the process of optically recording information.

Referring now to FIG. 1, the optical recording process takes place under the control of a general purpose computer. The central processing unit (CPU) 10 of the computer is connected through the storage access channel 11 to an access and control unit 12. The central processing unit also is connected to the main memory of the computer which may be any suitable type of storage arrangement employed in computers.

Access and control unit 12 may be considered to be a programmable switch accepting the information to be recorded as well as the control and logic signals for accomplishing the recording. Unit 12 also accomplishes the gating of signals to a display 13 for providing a visual indication of the actual information to be recorded prior to its recording. The recorder is indicated at 14. Recorder 14 may act as a mask generator for preparing the masks to be employed subsequently in a holographic storage system.

Display 13 is a display of the type such as IBM 2250 Display Unit Model 4. Such a unit is a cathode-ray tube unit that displays information as an output in alpha-numeric and graphic form. Operator machine communication ability is present through the use of a light pen and controls for the light pen 15. Connection is made from light pen and control 15 to control unit 12 through connector 16. Access is also provided for reentry back into the computer control system through connection 17 from a keyboard entry device 18. Keyboard 18 may take the form of the electronic keyboard described and claimed in application Ser. No. 861,884 filed Sept. 29, 1969 in the name of Vaughn Winkler and assigned to the same assignee as this invention.

The computer CPU 10 is shown in simplified form as including only memory address circuits 20, memory data registers 21 and an interrupt control 22. These circuits are connected to the main memory of the computer through the connections 23, 24, 25 respectively. Registers 21 connect bidirectionally with a data register 26 in control unit 12 through access channel 11. All information and control signals from the main memory are provided to unit 12 through connection 24 and register 26. The operation information is coupled to an operation decoder 27 through connection 28 and the address information to address registers 29 through connection 30.

Control unit 12 also comprises gating controls for accomplishing the recording and display of the information. These controls are indicated at 31. The input signals to controls 31 are provided for the operation control signals through connection 32 and for the information through connection 33. Controls 31 are connected, in turn, to display 13 and recorder 14.

Controls for reentry into the computer and for detection of the recorded information are provided at 34. The light pen and its controls and the keyboard are connected to controls 34 through the connections 16, 17 and the information detection from recorder 14 is provided through the connection 35. Controls 34 act through connection 36 of storage access channel 11 to control the interruption of the flow of information at 22 in CPU 10.

As already described, the computer utilized to accomplish the control of the recording of information is a general purpose computer. It may be the IBM System 1130. Such a system is a binary computing system designed for general purpose computing. It is oriented toward operation by an individual requiring a problem solution. It has a data word of 16 bits plus 2 parity bits. It includes three index registers and operates on indirect addressing. Its access channels provide for a high-speed cycle stealing mode of operation requiring low usage of the CPU time when it is used with I/O storage devices. It is particularly adapted for connection to a 2250 Display Unit Model 4.

Figure 3:
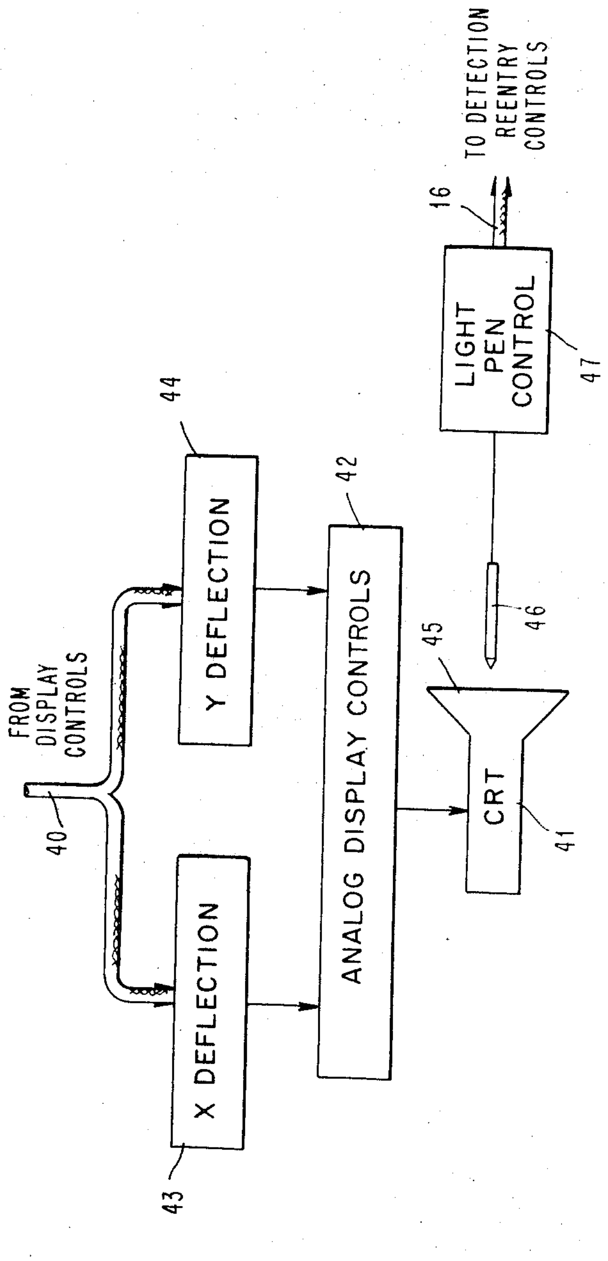
FIG. 3 is a block diagram of the display portion of the system of FIG. 1.

Display 13 is shown in some detail in FIG. 3. The control signals as well as the actual information signals are supplied through connection 40 from gating controls 31. The display is formed of a cathode-ray-tube-type visual display unit 41 which is operated by analog display controls 42 in response to $x$ and $y$ deflection signals provided at 43 and 44, respectively. In response to the electrical signals provided through connection 40, the information to be recorded in the optical recording system is displayed in scanlike manner on the face 45 of tube 41.

A light pen 46 is provided to alter any of the data displayed on face 45. This is accomplished through the light pen controls 47 connected to reentry control circuits 34 through connection 16. Under control of an operator, the light pen is employed to communicate with the main memory, writing when necessary at a desired storage location.

The display unit is provided as a real-time visual dynamic monitor of the optical recording. The addressing information provided through connection 40 is compatible with the addressing information provided to the optical recording system for generating the masks.

Figure 2:
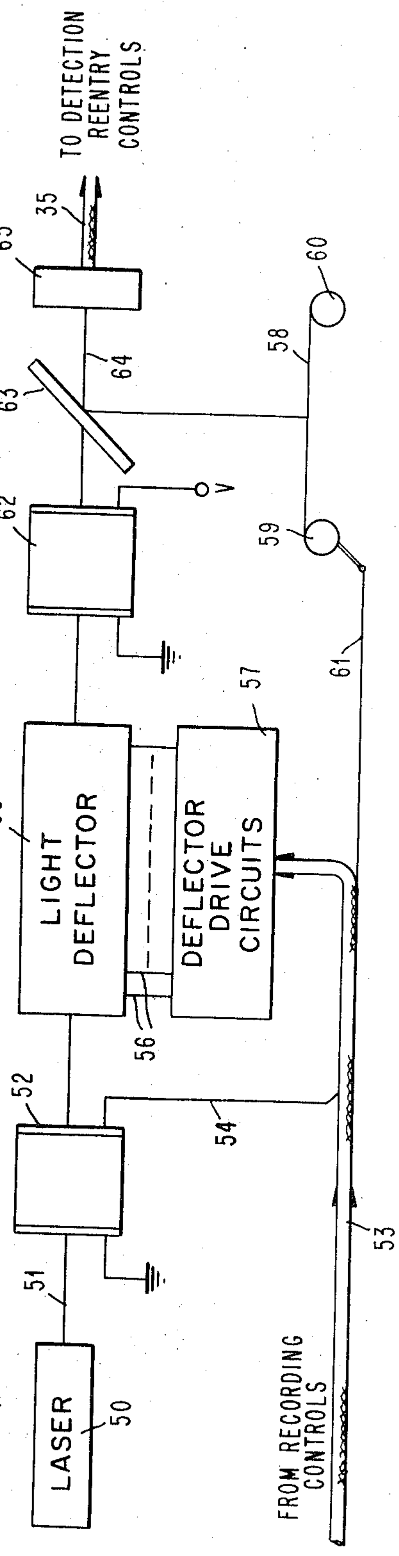
FIG. 2 is a block diagram of the optical recording system employed in the arrangement of FIG. 1.

Referring now to FIG. 2, the optical recording system comprises a light source, such as an argon laser 50, which provides a beam of light linearly polarized at 51 to a modulator 52. The modulator may be an electro-optic switch formed of an electro-optic crystal such as potassium dideuterium phosphate (KDP) having transparent electrodes affixed to its faces. The modulator acts as a shutter such that when an electrical signal is supplied from controls 31 through connection 53 and line 54 and applied across modulator 52, light is permitted to pass to a light deflector 55. Light deflector 55 is a plural stage light deflection apparatus which may be formed of any one or a combination of the types described in applications Ser. Nos., 285,832, now U.S. Pat. No. 3,499,700; 516,367, now U.S. Pat. No. 3,481,661 and 814,240, now U.S. Pat. No. 3,584,933, filed respectively June 5, 1963; Dec. 27, 1965 and Apr. 7, 1969 in the names of Harris et al.; Harris; and Habegger et al. All of these applications have been assigned to the same assignee as this invention.

For purposes of this description, each stage of the plural stage light deflection system may be considered to include an electro-optic polarization control device and a birefringent deflecting device. The electro-optic devices may be formed of potassium dideuterium phosphate (KDP) crystals having transparent electrodes affixed to their faces. The birefringent devices may be calcite crystals.

To accomplish the deflection of the light beam, electrical signals are selectively applied through the lines 56 to the transparent electrodes of the electro-optic devices. Deflector drive circuits 57 are connected to connection 53 and operate in response to the control signals provided from gating controls 31. The drive circuits may be of the type described in application Ser. No. 653,571, now U.S. Pat. No. 3,492,502, filed June 14, 1967 in the name of David C. Chang and entitled "Bi-Directional Capacitive Load Driver." This application has been assigned to the same assignee as this invention.

The light deflector acts to position the light beam at a desired location on a recording medium 58 which may be a photosensitive emulsion in tape form that appears a frame at a time when driven over tape reels 59 and 60 under control of signals from gating control circuits 31 provided through connection 53 and line 61. The light deflector acts in either a scanning manner or in a random positioning manner to deflect the light beam at any discrete location of medium 58.

Medium 58 may be a conventional photosensitive recording medium which accepts the light beam and provides an indication of the recording as the presence or absence of spots.

To accomplish the detection of the information recorded on medium 58 substantially concurrently with the recording of this information, a noise checking stage including an electro-optic switch 62 and a deflecting element 63 are provided in the path of the light beam from deflector 55. When activated by a suitable voltage v., switch 62 slightly rotates the polarization of the light beam incident on it such that when incident on birefringent plate 63, the major portion of the light is deflected to the recording medium and the noise component is deflected as beam 64 to a matrix of detecting elements 65. The detecting elements are connected to detection and reentry controls 34 through the connection 35. The matrix of detectors has one detector for each possible information recording position on a frame of medium 58.

Deflecting element 63 may be a conventional beam splitter which permits a small portion of the light to pass through for detection at 65. It may be formed of a plurality of dichroic layers that are reflective and which divide the light up into the primary component for transmission to recording medium 58 and the secondary component for detection. Detector matrix 65 may also be a single device as opposed to the matrix of devices to cover the entire field.

Figure 4:
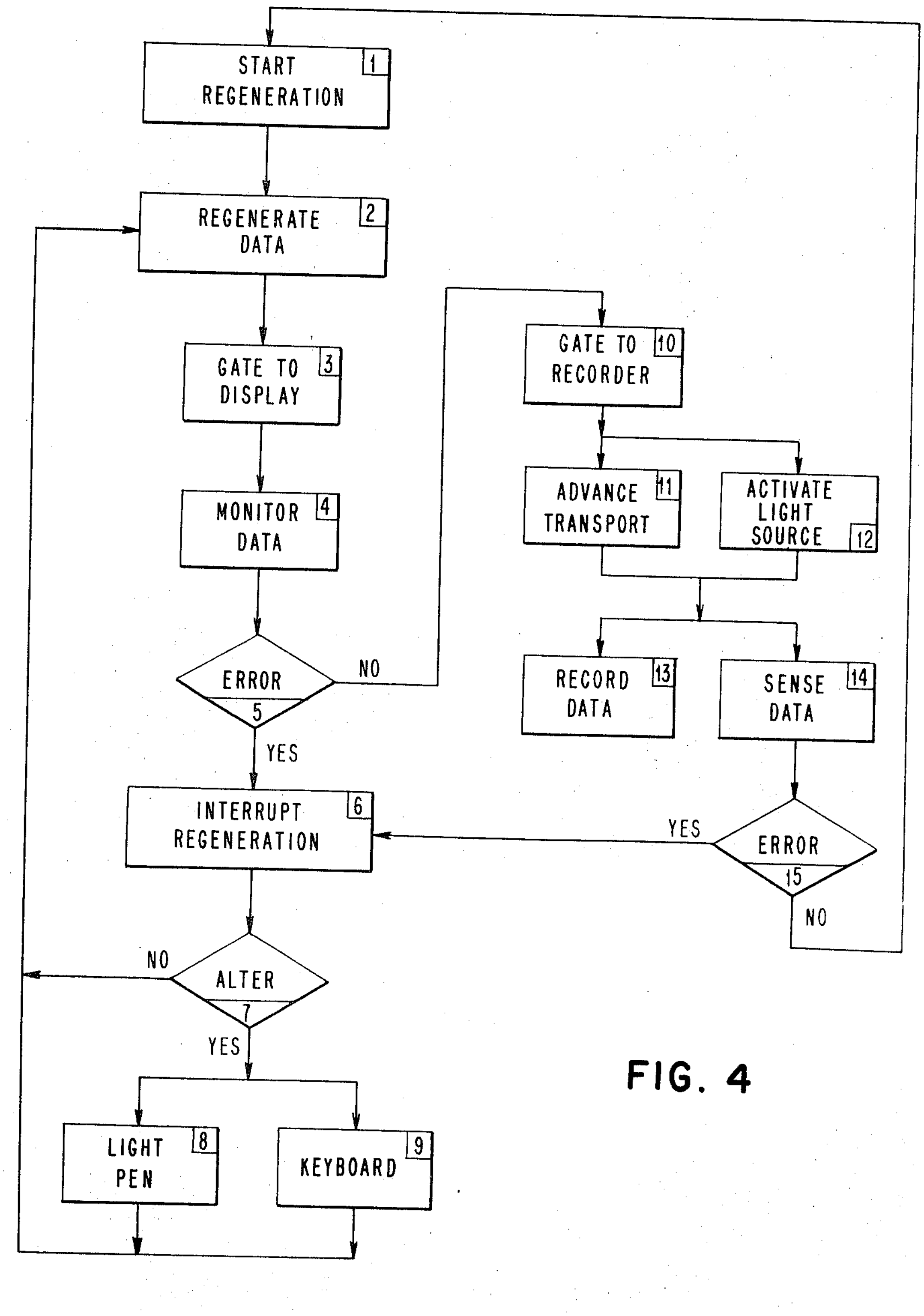
FIG. 4 is a flow diagram showing the process and the control exercised in optically recording information.

In operation as shown in the flow chart of FIG. 4, a START REGENERATION command is provided to the display from the CPU of the computer (Block 1). Accessing of the main memory of the computer continues uninterrupted providing the data and control information through the data register 26 and decoder 27 to the recording and display controls 31 (Block 2). When suitable gating signals are provided to controls 31, the data is gated to display 13 (Block 3) and is provided on the face 45 of CRT 41. The operator monitors the provision of this data (Block 4). Monitoring is performed to determine if any error exists in the data to be recorded. If the operator detects an error (Block 5), the regeneration of the data is interrupted (Block 6) and a decision is made as to whether the data is to be altered (Block 7). If the alteration is not to be performed, an appropriate indication is made to the CPU 10 and the regeneration of data continues (Block 2).

If alteration of the data is to be performed by rewriting in the main memory, this is communicated to the interrupt control and through the line 25 to the main memory (Block 7). While the rewriting occurs, regeneration of the data is interrupted. Alteration can be accomplished using light pen 46 operating through the light pen control 47 (Block 8) or by manual entry through the keyboard 18 (Block 9). If an error condition is not observed or once the operator is satisfied that the information to be recorded is accurate the information is gated to recorder 14 (Block 10), either by operator command or by a delay built in the control signals provided to data register 26 and operation decoder 27.

To gate the information for recording, control signals are provided through connection 53 to the recorder to activate modulator 52 and to advance the recording medium transport such that a desired frame 58 is provided by the tape reels 59, 60 (Blocks 11, 12). Concurrently, the recording of the data occurs under the control of the deflector drive circuits 57. The recording is performed in scanning manner line by line or it can be accomplished randomly dependent upon the signals provided by the drive circuits 57 through the lines 56 (Block 13).

Sensing of the recorded data is performed by the beam portion 64 directed to the detection matrix 65 (Block 14). The beam 64 appears on the matrix 65 at a position corresponding to the position at recording medium 58. The sensing enables errors of position to be detected (Block 15) as well as a failure of the light source or of one of the deflection circuits. If an error or malfunction exists in sensing the data, the regeneration of the data is interrupted through connection 36 to interrupt control 22. At this time, the decision to alter the data is negative as no change can be made in the data recorded on the medium 58. However, the transport can be advanced and the regeneration of the data restarted at a new frame. If no error condition exists, the recording process continues until the frame is completely recorded and the regeneration process starts for the next frame of information. In the event that an error is detected in sensing the data, the central processing unit can determine the cause of the interrupt and appropriate action initiated.

In a system, such as a holographic storage system, the checking the recording of information in the formation of masks is extremely important. The final output of the recording system is many thousands of frames of latent images. In the absence of such an arrangement for detecting errors in the information before the recording takes place and of the existence of an error or malfunction condition in the recording system, there is no way for ascertaining errors in the recorded pattern until after the recording operation has been completed.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. In combination with computing apparatus having means for storing data indicative of information to be recorded and selectively displayed and instructions for controlling the recording and display, a central processing unit for initiating the retrieval of said data and instructions from said storing means, and means responsive to said instructions for controlling the routing of said data to accomplish the recording and display of said information, a system for recording information at predetermined ones of a matrix of addressable locations on a recording medium as the presence or absence of light spots and having provision for selectively displaying the information for recording by said system, comprising an optical recording system coupled to said control means and including a light source, and means responsive to said data when provided from said control means for selectively positioning the light from said source at said predetermined ones of said addressable locations on said medium to form latent images of said light spots, and means coupled to said control means and responsive to data from it for selectively providing a real-time display of the information to be recorded at addressable locations on said display having positional correspondence to the locations of recording on said medium.

2. In combination of claim 1, wherein the control means comprises means for gating data and instructions to said central processing unit and said system further comprising means coupled to said gating means for generating an instruction under operator control interrupting the retrieval of said data and instructions from the storing means and for generating data altering the stored data.

3. In the combination of claim 2, and further comprising means coupled to said optical recording system for detecting the occurrence of a malfunction in the optical recording system substantially concurrently with said recording and for providing an indication of said malfunction to said central processing unit.

4. In the combination of claim 3, wherein means are provided in said optical recording system for splitting out a portion of the selectively positioned light for detection of said malfunction.

* * * * *